United States Patent [19]
Horike et al.

[11] Patent Number: 4,510,509
[45] Date of Patent: Apr. 9, 1985

[54] INK EJECTION HEAD

[75] Inventors: Masanori Horike, Tokyo; Tatsuya Furukawa; Takuro Sekiya, both of Yokohama; Yutaka Ebi, Kawasaki; Takuro Isayama; Masaaki Tachiki, both of Tokyo, all of Japan

[73] Assignee: Ricoh Company, Ltd., Tokyo, Japan

[21] Appl. No.: 472,530

[22] Filed: Mar. 7, 1983

[30] Foreign Application Priority Data

Mar. 9, 1982 [JP] Japan .......... 57-37007
Mar. 9, 1982 [JP] Japan .......... 57-37008

[51] Int. Cl.[3] .......... G01D 15/18
[52] U.S. Cl. .......... 346/140 R
[58] Field of Search .......... 346/140, 75

[56] References Cited

U.S. PATENT DOCUMENTS 4,263,601 4/1981 Nishimura .......... 346/140 X
4,333,086 6/1982 Ebi .......... 346/140

OTHER PUBLICATIONS

Wicklund H. P.; Nonimpact Printer; IBM TDB, vol. 20, No. 7, Dec. 1977, pp. 2814–2815.

*Primary Examiner*—Joseph W. Hartary
*Attorney, Agent, or Firm*—David G. Alexander

[57] ABSTRACT

A new nozzle structure is disclosed for an ink ejection head of an electric field on-demand type ink jet printer. A plurality of circular nozzles and first electrodes integral with the nozzles are arranged along the widthwise direction (X direction) and feed direction (Y direction) of a sheet of paper. A plurality of lead terminals are individually connected to the arrays of the first electrodes each of which extends in the Y direction. Second electrodes are located at the rear of the first electrodes and individually connected to the arrays of the first electrode each of which extends in the X direction. A third or counter electrode is positioned in front of the first electrodes and at the back of the sheet. Each of the second electrodes is mounted on a nozzle plate or a nozzle support. The first electrodes are supplied with voltage pulses corresponding to image data, the second electrodes for printing with a voltage opposite in polarity to the voltage pulses, and the second electrodes for non-printing with a zero voltage or a voltage common in polarity to the voltage pulses sequentially and repeatedly on the time sharing basis. The third electrode is applied with a constant voltage of the opposite polarity to the voltage pulses.

5 Claims, 8 Drawing Figures

INK EJECTION HEAD

BACKGROUND OF THE INVENTION

The present invention relates to an improvement in an ink jet printer and, more particularly, to an improvement in a nozzle section of an ink ejection head installed in an electric field on-demand type ink jet printer.

A so-called electric field on-demand type ink jet printer is known in which ink at the foremost end of a nozzle in an ink ejection head is effected by a concentrated electric field to form a jet for printing out data on a sheet of paper (see Japanese Utility Model Publication No. 54-19874/79 and Japanese Patent Laid Open Publication No. 56-8268/81). This type of ink jet printers, however, have experienced difficulty in achieving a highly integrated multi-nozzle construction. Although an attempt has been made to arrange nozzles in zigzag pattern, it has still been difficult to set up a density as high as eight nozzles/mm over the width of an A4 format (290 mm).

SUMMARY OF THE INVENTION

It is an object of the present invention to provide an ink ejection head for an electric field on-demand type ink jet printer which promotes stable atomization of ink into droplets.

It is another object of the present invention to provide an ink ejection head for an electric field on-demand type ink jet printer which has a new nozzle construction wherein the structure of various electrodes for controllably driving ink ejection is simplified to facilitate integration of the nozzles.

It is another object of the present invention to provide an ink ejection head for an electric field on-demand type ink jet printer which can be driven and controlled by a simple control device.

It is another object of the present invention to provide a generally improved ink ejection head for an electric field on-demand type ink jet printer.

An ink ejection head for an ink jet printer embodying the present invention prints out data on a sheet of paper by ejecting droplets of ink under the effect of an electric field. The ink ejection head includes a nozzle plate and a plurality of nozzles formed through the nozzle plate to form a matrix in the widthwise direction and feed direction of the sheet. A plurality of first electrodes are integrally located each on the inner periphery of one of the nozzles adjacent to an ink ejection port thereof. The first electrodes individually face the sheet. A plurality of lead terminals are connected each commonly to the first electrodes which are integral with the nozzles which form an array in the sheet feed direction. A plurality of second electrodes are connected each commonly to the nozzles which form an array in the widthwise direction of the sheet. The second electrodes are located at the rear of the first electrodes. A counter electrode assembly is positioned in front of the first electrodes and at the back of the sheet, serving as a third electrode.

The above and other objects, features and advantages of the present invention will become apparent from the following detailed description taken with the accompanying drawings.

DESCRIPTION OF THE PREFERRED EMBODIMENTS

While the ink ejection head of the present invention is susceptible of numerous physical embodiments, depending upon the environment and requirements of use, substantial numbers of the herein shown and described embodiments have been made, tested and used, and all have performed in an eminently satisfactory manner.

Figure 1:
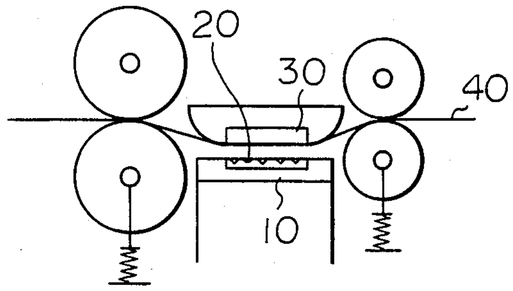
FIG. 1 is a fragmentary schematic side elevation of an ink jet printer to which an ink ejection head of the present invention is applicable.
Figure 2:
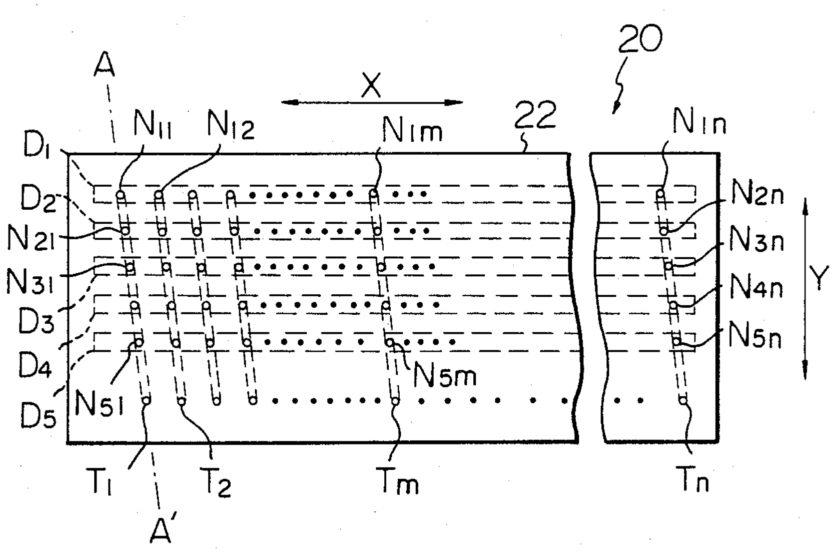
FIG. 2 is an enlarged front view of a nozzle section included in the ink ejection head of FIG. 1.

Referring to FIG. 1 of the drawings, the ink ejection head of the present invention is shown and generally designated by the reference numeral 10. The head 10 has a nozzle section 20 which is located to face a counter electrode 30 with the intermediary of a sheet of paper 40. As shown in FIG. 2, the nozzle section 20 comprises a nozzle plate 22 which is formed with a number of nozzles $N_{11}$–$N_{5n}$ in two dimensional matrix, i.e., arranged in the X and Y directions which are perpendicular to each other. A first electrode d (see FIG. 4) is rigidly carried on the inner periphery of each nozzle N. Lead terminals $T_1$–$T_n$ are adapted to connect the first electrodes d each by an array of five of the latter which extends along the Y or sheet feed direction. The lead terminal $T_1$, for example, interconnects the first electrodes d of an array of five nozzles $N_{11}$, $N_{21}$, $N_{31}$, $N_{41}$ and $N_{51}$. The same principle holds for the other lead terminals up to $T_n$ which connects the first electrodes d of the nozzles $N_{1n}$, $N_{2n}$, $N_{3n}$, $N_{4n}$ and $N_{5n}$. The lead terminals $T_1$–$T_n$ are supplied with voltage pulses which correspond to an image data signal.

Figure 3:
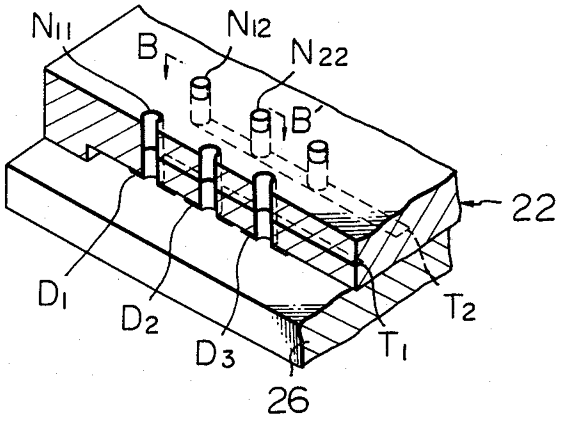
FIG. 3 is a fragmentary section along line A—A' of FIG. 2.
Figure 4:
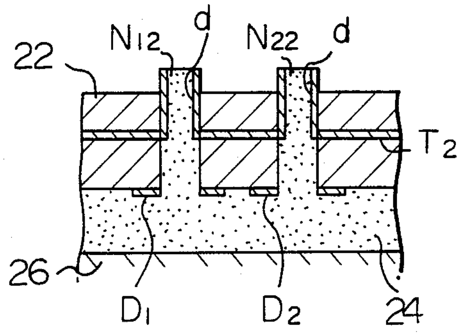
FIG. 4 is an enlarged section along line B—B' of FIG. 3.
Figure 5:
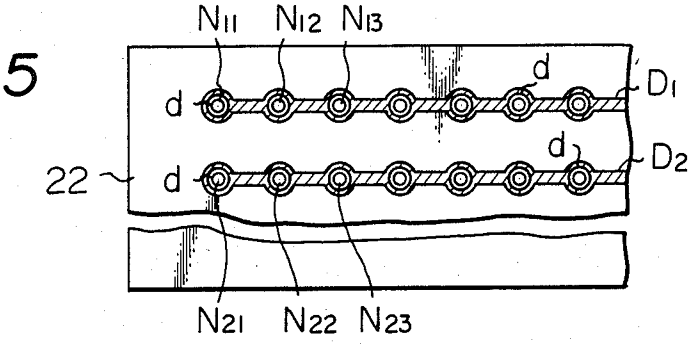
FIG. 5 is a fragmentary view of a nozzle plate of FIGS. 3 and 4 as seen from the ink chamber side.

The nozzle plate 22 defines an ink chamber 24 in cooperation with a nozzle support 26 which is adapted to support the nozzle plate 22. As shown in FIGS. 3–5, the nozzles N in the nozzle plate 22 are individually surrounded by second electrodes $D_1$–$D_5$ at their ends adjacent to the ink chamber 24. The second electrode $D_1$ comprises a shaped strip which is commonly connected to the nozzles $N_{11}$–$N_{1n}$ which are aligned along the width of the sheet or X direction. The same applies to the other second electrodes up to $D_5$ which is commonly connected to the array of the nozzles $N_{51}$–$N_{5n}$. In each of the nozzle arrays $N_{11}$–$N_{51}$ to $N_{1n}$–$N_{5n}$, the nozzles are progressively shifted by a pitch of 0.1 mm along the width of the sheet or X-direction, so that a resolution as high as 10 dots/mm may be attained by the selection of the first electrodes d and second electrodes $D_1$–$D_5$ associated with the respective nozzles.

As viewed in FIG. 4, each first electrode d in the nozzle construction is designed to protrude from the front surface of the nozzle plate 22. The leads $T_1$–$T_n$ extending from the first electrodes d are individually varied in the nozzle plate 22, as shown in FIGS. 3 and 4. The second electrodes D extend in parallel with each other in the sheet feed direction or Y-direction so that each of them may be shared by an array of nozzles N which are aligned in the X direction; the second electrode $D_1$ is shared by the nozzle array $N_{11}$–$N_{1n}$, the second electrode $D_2$ by the nozzle array $N_{21}$–$N_{2n}$, the second electrode $D_3$ by the nozzle array $N_{31}$–$N_{3n}$, the second electrode $D_4$ by the nozzle array $N_{41}$–$N_{4n}$, and the second electrode $D_5$ by the nozzle array $N_{51}$–$N_{5n}$.

Suppose that the counter electrode or third electrode 30 at the back of the sheet 40 is supplied with a negative high tension d.c. voltage of 2–4 kV, that the first electrodes d are supplied with positive voltage pulses of 300–800 V from a control circuit (not shown) which represent image data, and that the second electrodes D to join in the printout operation are supplied with a negative voltage of 300–800 V and the rest with a voltage of ground level or positive 300–800 V. Then, ink will be ejected from those nozzles across the first and second terminals of which are applied the voltage pulses.

As well known in the art, supposing that the electric field developed by the first to third electrodes exerts a force $\dot{F}$ on the ink at the foremost end of a nozzle, the mechanism of ink ejection may be represented by an equation:

$$\dot{F}=\alpha \cdot \mathrm{grad}(\dot{E})^2+q\dot{E}$$

where $\alpha$ is the coefficient associated with the polarizing force of the ink, q a charge induced in the ink by the external electric field, and $\dot{E}$ the intensity of the electric field.

The polarizing force represented by the first item of the equation shown above results from the voltage pulse applied across the first and second electrodes. The Coulomb's force represented by the second item is developed by the d.c. voltage applied across the third electrode. These forces are combined to grow a meniscus of the ink at the outlet of the nozzle, while the concentration of the electric field from the third electrode becomes accelerated in accordance with the growth of the meniscus. A jet of ink forms itself out of the nozzle at the instant the force $\dot{F}$ has overcome the surface tension of the meniscus.

It will be noted that an on-demand type ink jet printer of the type shown and described will achieve a stable jet of ink if the ink has a resistivity which is not smaller than $10^4$ Ωcm and not larger than $10^{10}$ Ωcm.

Figure 8:
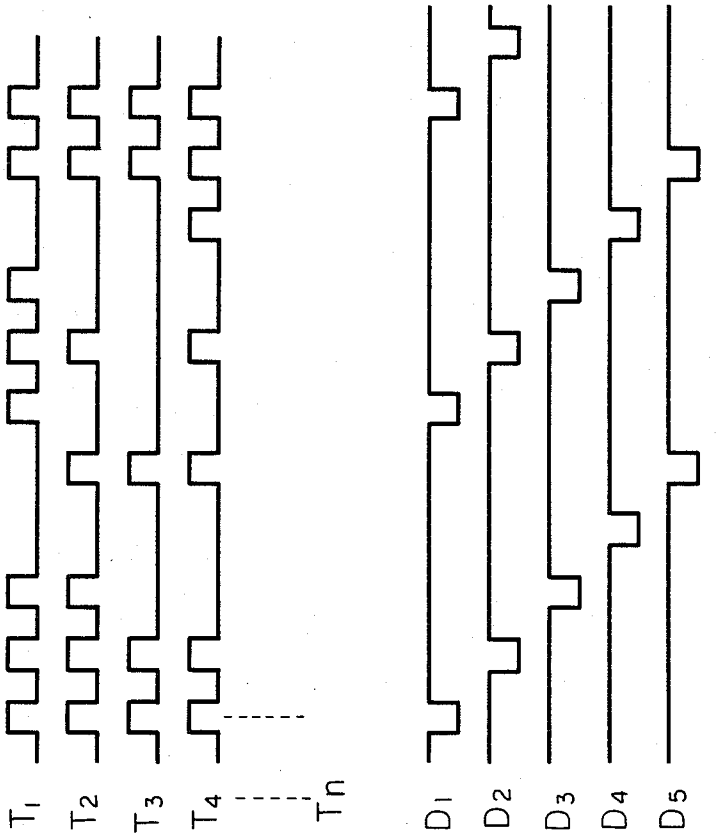
FIG. 8 is a timing chart showing signals coupled to different electrodes which are arranged in the neighborhood of each nozzle.

Referring to FIG. 8, voltage pulses for ink ejection are applied to the nozzle arrays as represented by the timing chart. As shown, while pulse signals of positive 300–800 V indicative of image data are supplied to the lead terminals $T_1$–$T_n$, a voltage pulse of negative 300–800 V is supplied sequentially and repeatedly to the second electrodes $D_1$–$D_5$ on the time sharing basis. Such a matrix drive of the nozzles will cut down the number of necessary control circuits and, therefore, the cost.

In summary, it will be seen that the present invention provides an ink ejection head which insures stable atomization of ink into droplets due to the integral assembly of a circular nozzle and a first electrode. The ink ejection head is easy to be integrated because an array of nozzles share a common second electrode to simplify the electrode structure. Moreover, the matrix drive for ink ejection reduces the number of necessary control circuits and, thereby, makes the ink ejection head economical.

Figure 6:
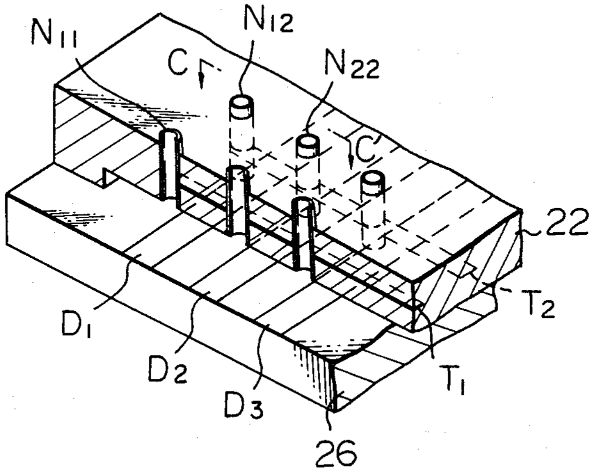
FIG. 6 is a fragmentary section along line A—A' of FIG. 2 but showing another embodiment of the nozzle section in accordance with the present invention.
Figure 7:
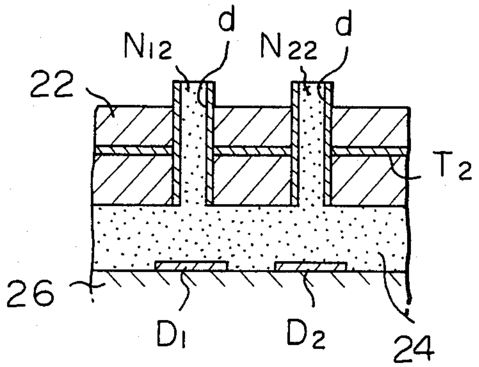
FIG. 7 is an enlarged section along line C—C' of FIG. 6.

Various modifications will become possible for those skilled in the art after receiving the teachings of the present disclosure without departing from the scope thereof. For example, as shown in FIGS. 6 and 7, the second electrodes $D_1$–$D_5$ may be mounted on the nozzle support 26 which faces the first electrodes d with the intermediary of the ink chamber 24, instead of the nozzle plate 22 as has been the case with the embodiment shown and described.

What is claimed is:

1. An ink ejection head for an ink jet printer which prints out data on a sheet of paper by ejecting droplets of ink under the effect of an electric field, comprising:
   - a nozzle plate;
   - a plurality of nozzles formed through said nozzle plate to form a matrix in the widthwise direction and feed direction of the sheet;
   - a plurality of first electrodes each being integrally located on the inner periphery of one of the nozzles adjacent to an ink ejection port thereof, said first electrodes facing the sheet;
   - a plurality of lead terminals each being commonly connected to the first electrodes which are integral with the nozzles which form an array in the sheet feed direction;
   - a plurality of second electrodes each being commonly connected to the nozzles which form an array in the widthwise direction of the sheet, said second electrodes being located at the rear of the first electrodes; and
   - a counter electrode assembly positioned in front of the first electrodes and at the back of the sheet, said counter electrode assembly constituting a third electrode;
   - each nozzle ejecting droplets of ink in response to first, second and third predetermined voltages applied to the first electrode and second electrode associated with said nozzle and the third electrode respectively.

2. An ink ejection head as claimed in claim 1, further comprising a support member for supporting the nozzle plate, and an ink chamber defined between said support member and the nozzle plate.

3. An ink ejection head as claimed in claim 2, in which the second electrodes are mounted on a surface of the nozzle plate which is adjacent to the ink chamber.

4. An ink ejection head as claimed in claim 2, in which the second electrodes are mounted on the support member to face the nozzles with the intermediary of the ink chamber.

5. An ink ejection head for an ink jet printer which prints out data on a sheet of paper by ejecting droplets of ink under the effect of an electric field, comprising:
   - a nozzle plate;
   - a plurality of nozzles formed through said nozzle plate to form a matrix in the widthwise direction and feed direction of the sheet;
   - a plurality of first electrodes each being integrally located on the inner periphery of one of the nozzles adjacent to an ink ejection port thereof, said first electrodes facing the sheet;

a plurality of lead terminals each being commonly connected to the first electrodes which are integral with the nozzles which form an array in the sheet feed direction;

a plurality of second electrodes each being commonly connected to the nozzles which form an array in the widthwise direction of the sheet, said second electrodes being located at the rear of the first electrodes; and a counter electrode assembly positioned in front of the first electrodes and at the back of the sheet, said counter electrode assembly constituting a third electrode;

the first electrodes being supplied with voltage pulses corresponding to image data via the lead terminals, the second electrodes to join in the printout operation being supplied with a voltage opposite in polarity to the voltage pulses, and the rest of the second electrodes being supplied with a zero voltage or a voltage common in polarity to the voltage pulses in a sequential and repeated manner on the time sharing basis, the third electrode being supplied with a constant voltage which is opposite in polarity to the voltage pulses.

* * * * *